United States Patent
Dewar et al.

[11] 3,911,255
[45] Oct. 7, 1975

[54] COMPASS SYSTEMS

[75] Inventors: David Mason Dewar, Wokingham; Peter Dosell Finch, Woking, both of England

[73] Assignee: Sperry Rand Corporation, New York, N.Y.

[22] Filed: July 11, 1974

[21] Appl. No.: 487,485

[30] Foreign Application Priority Data
July 20, 1973  United Kingdom............... 34607/73

[52] U.S. Cl............ 235/150.25; 33/317 R; 33/318; 33/324
[51] Int. Cl.²...................... G06G 7/78; G01C 19/34
[58] Field of Search....... 235/150.2, 150.25, 150.26; 33/317, 318, 319, 323, 324, 328, 355, 356

[56] References Cited
UNITED STATES PATENTS

| | | | |
|---|---|---|---|
| 2,823,464 | 2/1958 | Snodgrass | 33/318 X |
| 2,988,818 | 6/1961 | Madden et al. | 33/318 X |
| 3,269,024 | 8/1966 | Fischer et al. | 235/150.25 X |
| 3,276,273 | 10/1966 | Baker | 33/317 R X |
| 3,633,003 | 1/1972 | Talwani | 235/150.25 |
| 3,790,766 | 2/1974 | Brown | 235/150.25 |

Primary Examiner—Malcolm A. Morrison
Assistant Examiner—Jerry Smith
Attorney, Agent, or Firm—Howard P. Terry

[57] ABSTRACT

A compass system having a stabilised directional gyroscope which avoids the need for extra gimbals in the directional gyroscope. The directional gyroscope has inner and outer gimbals and a pick-off operable to provide an output signal representative of the true angle between the inner and outer gimbals, a function not normally performed in known compass systems. The true angle between the inner and outer gimbals is compared with the angle which would exist if the plane of the inner gimbal were parallel to the Earth's horizontal field, and the difference therebetween being applied to an erection system of the directional gyroscope.

10 Claims, 2 Drawing Figures

COMPASS SYSTEMS

BACKGROUND OF THE INVENTION

1. Field of the Invention

This invention relates to compass systems particularly, although not exclusively, for aircraft.

2. Description of the Prior Art

Compass systems employing a simple two-degree-of-freedom gyroscope are well known but suffer certain disadvantages due to the essential need for the spin axis of the gyroscope to be maintained approximately horizontal. If this is not done, gross heading errors result and in the extreme case, the spin axis may precess through 90° causing gimbal lock and toppling of the gyroscope. There are two basic methods of maintaining the spin axis horizontal commonly employed, the first involving the mounting of a gravity sensor effectively on the spin axis and driving an erection torque motor with the output signal of the gravity sensor so that the spin axis is held horizontal with respect to the local vertical. The second method involves stabilising the gyroscope by isolating it from the pitch and roll motion of the vehicle in which the compass system is fitted, such as an aircraft, so that the outer gimbal of the directional gyroscope remains vertical, and employing a pick-off mounted between the inner and outer gimbals, the output signal from the pick-off being fed to the erection torquer which maintains the angle between the two gimbals at 90°. For convenience, these two methods will be further discussed with reference to compass systems for aircraft.

In the first method referred to of maintaining the spin axis of the gyroscope horizontal, the gravity sensor itself suffers serious disadvantages whether it is in the form of an accelerometer or a liquid level. Firstly, the gravity sensor is incapable of distinguishing between gravitational and aircraft accelerations so that during protracted turns of the aircraft, for example, the sensor will operate to erect the spin axis to a direction very different from the true horizontal. Furthermore, if the turns off the aircraft are continued for any length of time, the spin axis will oscillate about the horizontal position with an amplitude which may be as great as 10°.

This error may be reduced by rendering the erection system of the gyroscope inoperative if the aircraft bank angle exceeds a pre-set limit (typically 6°), but if this condition persists (during continuoous orbits, for example,) frictional torques about the outer gimbal axis will cause the uncontrolled spin axis to precess off to a large angle. An alternative solution when the sensor is an accelerometer is to integrate the accelerometer output signal to give a signal representative of velocity, and to compare this with a signal representative of measured aircraft velocity. Any discrepancy is then attributed to a component of gravitational acceleration being detected by the accelerometer; i.e., the accelerometer, and hence the spin axis, is not horizontal. The erection torquer is then driven appropriately to correct the tilt. This system (known as the second-order erection) requires an aircraft velocity reference to be available, and a large amount of computing to resolve velocity signals from one source into the same set of axes as the signals from the other source.

A disadvantage arising out of the use of a liquid level is that under tilt or acceleration conditions, the liquid inside the liquid level flows to one end of the device, creating a mass unbalance on the spin axis, and hence a precession of the outer gimbal of the gyroscope. This, of course, creates a heading error in the compass system. Another problem associated with the use of a liquid level is that it cannot be connected to the usual 115 volt supply in the aircraft used to drive the gyroscope spin motor, whereby slip rings or flexible connections have to be fitted between the outer and inner gimbals to carry power to the liquid level and to extract the output signal therefrom. This gives rise to spurious torques which cause the gyroscope to precess in azimuth, again causing heading errors.

A two-degree-of-freedom gyroscope suffers from gimballing errors which are an unavoidable geometric effect of the lack of the third degree of freedom. They cause large heading errors during manoeuvres of the aircraft which disappear completely when the aircraft resumes level flight. It is possible to correct for these errors, given aircraft pitch and roll information, but this correction will in general only be exact if the spin axis is truly horizontal. If this is not the case, an exact correction can still be applied if the angle between the inner and outer gimbals is measured, but this is not normally done on simple directional gyros of the type under discussion.

In spite of these various disadvantages, this first method of maintaining the spin axis horizontal offers the advantages that the resulting device is relatively simple, and hence cost-effective, and is not unduly bulky which is always an important consideration, particularly in relation to aircraft instruments.

Turning now to the second basic method of maintaining the spin axis of a two-degree-of-freedom gyroscope horizontal referred to above, the gyroscope is usually mounted inside two additional gimbals which are slaved to the output of a vertical gyro, whereby the outer gimbal of the directional gyroscope will remain essentially vertical. This spin axis is kept horizontal by detecting any deviations from perpendicularity between the inner and outer gimbals. The pick-off is a null device and does not actually measure the angle in question.

This system reduces the seriousness of the inability of a gravity sensor to distinguish between gravitational and aircraft accelerations, referred to above because the erection control of the directional gyroscope adds an extra time constant between the liquid levels employed in the vertical gyroscope and the spin axis erection torquer. The vertical gyroscope also employs erection cut-off during aircraft manoeuvres but in this case, frictional torques are about the spin axis of the vertical gyroscope and are of little consequence. The effect referred to of the liquid in the liquid levels flowing to the ends of the respective devices tending to create a mass unbalance is reduced for the same reason, whilst the problem concerning the use of the 115 volt supply also referred to is not applicable because the pick-off can be a 115 volt synchro running off the spin motor supply. The gimballing errors referred to in relation to the first basic method discussed above are reduced in this second method because of the improvements concerning the other problems mentioned, but although there is a pick-off between the outer and inner gimbals of the directional gyroscope which detects deviations from perpendicularity therebetween, the output signal from the pick-off is not in a form suitable to carry out complete gimbal error correction.

The main disadvantage of this second method is the engineering complexity of the extra gimbals and the bulk of the assembly. Such a configuration is usually combined mechanically with the vertical gyroscope to form a stabilised platform the cost of which is much higher than a combination of simple vertical and directional gyroscopes.

SUMMARY OF THE INVENTION

According to the present invention a compass system for a vehicle comprises a two-degree-of-freedom directional gyroscope having inner and outer gimbals and operable to produce an electrical output signal representative of the heading of the vehicle in which the compass system is fitted, vertical reference means operable to provide an output signal representative of pitch and/or roll of the vehicle, computer means operable to derive from the output signals of the directional gyroscope and the vertical reference means a signal representative of the angle between the inner and outer gimbals of the directional gyroscope which would exist if the plane of the inner gimbal were parallel to the Earth's horizontal axis, and comparator means operable to compare the gimbal angle signal with an output signal from a pick-off operable to measure the true angle between the inner and outer gimbals of the directional gyroscope to provide an output signal representative of the error in the angle between the inner and outer gimbals of the directional gyroscope, the error signal being applied to an erection system forming part of the directional gyroscope to adjust the plane of the inner gimbal substantially parallel to the Earth's horizontal axis.

Since the pick-off is used to provide a signal representing an actual measure of the angle between the inner and outer gimbals of the directional gyroscope, a function not normally performed in known compass systems using simple directional gyroscopes, this can be used to great advantage in improving the accuracy of the overall compass system by providing full gimbal error correction. As discussed above, the pick-off in previous systems is usually employed as a null device so that an actual measure of inner/outer gimbal angle is not obtained, whereby full gimbal correction cannot be implemented.

A compass system in accordance with the invention has the cost-effective and size advantages of the first prior art arrangement for keeping the spin axis of the directional gyroscope horizontal and yet at least the accuracy of the second prior art arrangement discussed above. The accuracy of a system in accordance with the invention is in fact improved compared with that of known compass systems, particularly when taking advantage of the ability to effect full gimbal error correction, whereby the invention constitutes a significant advance in the art.

BRIEF DESCRIPTION OF THE DRAWING

Gyromagnetic compass systems in accordance with the present invention and designed for an aircraft will now be described in greater detail, by way of example, with reference to the accompanying drawings, in which.

DESCRIPTION OF THE PREFERRED EMBODIMENT

Figure 2:
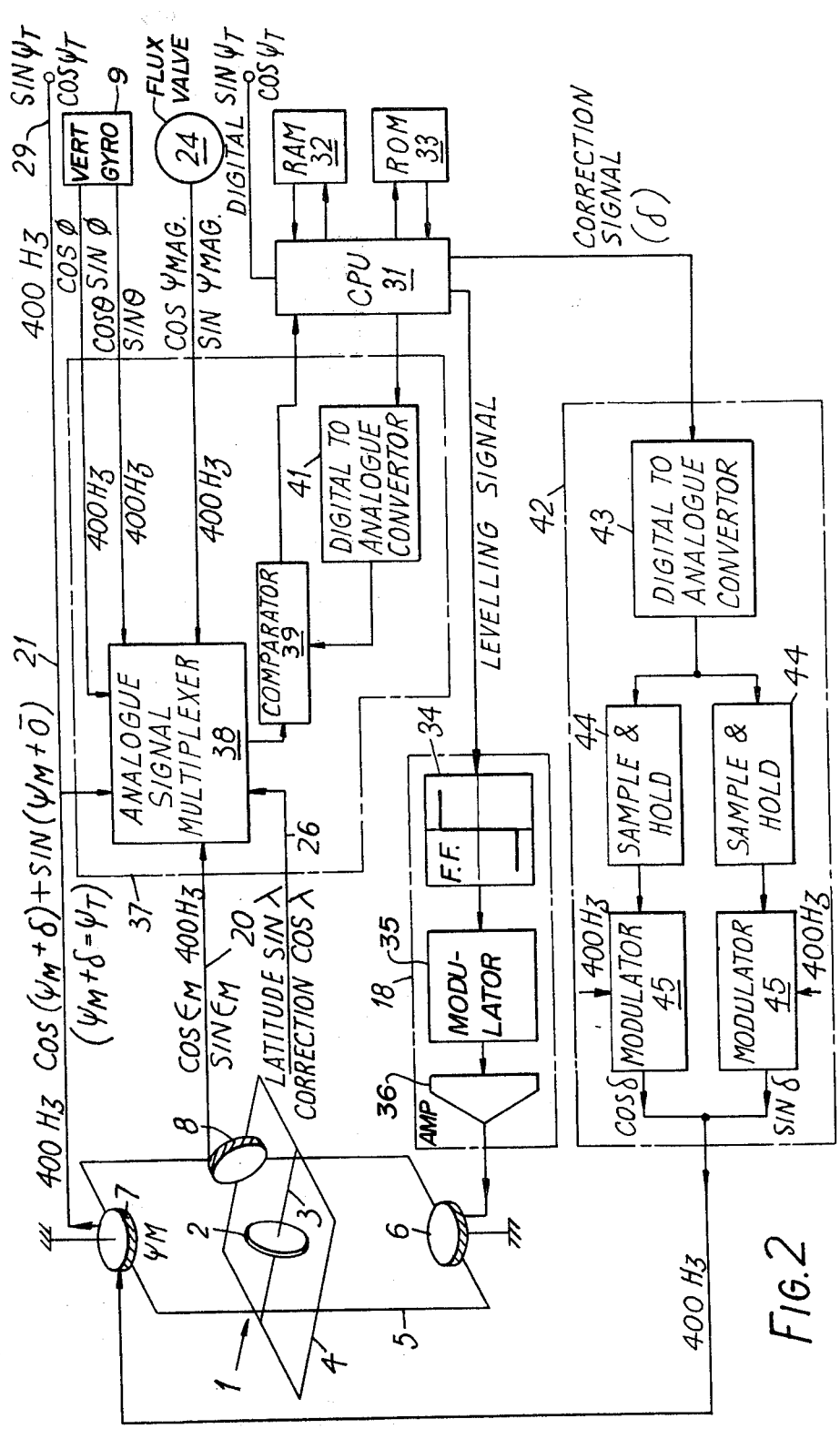
FIG. 2 is a more detailed block diagram of a preferred compass systems.

The compass system comprises a simple two-degree-of-freedom directional gyroscope 1 which is similar to that shown in more detail, although diagrammatically, in FIG. 2. The gyroscope comprises a rotor 2 rotatable about a spin axis 3, an inner gimbal 4, an outer gimbal 5 mounted on the frame of the aircraft (not shown), an erection torquer 6 operable to precess the gyroscope to maintain the spin axis 3 substantially horizontal, a pick-off 7 operable to provide an output signal representing the heading angle $\psi_m$ of the aircraft, and a further pick-off 8 operable to measure the angle $\epsilon_m$ between the gimbals 4 and 5 which it is desired to maintain so that the spin axis 3 is kept horizontal. The directional gyroscope 1 could be in the form of a flex gyroscope.

The compass system further comprises a vertical reference unit in the form of a two-degree-of-freedom vertical gyroscope 9 although it could alternatively take the form of a flex gyroscope, rate gyroscope, a pendulous device or an accelerometer, for example. The vertical gyroscope 9 provides two output signals on respective lines 11 and 12, the output signal on line 11 representing the pitch angle $\theta$ of the aircraft and the signal on line 12 representing the roll angle $\psi$ of the aircraft. These roll and pitch signals are applied to a digital computing circuit 13 forming part of an overall digital processor 14, the output signal from the pick-off 7 of the directional gyroscope 1 also being applied to the computing circuit 13, the circuit deriving from these various inputs a signal $\epsilon_c$ on a line 15 representing a first measure of the angle $\epsilon$ between the inner and outer gimbals 4 and 5 of the directional gyroscope 1. The function of the computing circuit will be discussed in greater detail hereinafter.

The signal on line 15 is applied as one input to a digital comparator 16 which also forms part of the processor 14. The value $\epsilon_m$ of the gimbal angle $\epsilon$ measured by the pick-off 8 of the directional gyroscope 1 forms a second input to the comparator 16, whereby the output signal thereof on line 17 represents the error in the gimbal angle as given by $\epsilon_m - \epsilon_c$. This error signal is applied to the erection torquer 6 of the directional gyroscope 1, via a conventional erection control law circuit 18, the torquer then operating to precess the directional gyroscope in the appropriate direction to reduce the error signal to zero so that the spin axis 3 is maintained substantially horizontal.

The compass system also comprises a further digital computing circuit 19 which operates to give full gimbal error correction, thereby compensating for the errors arising of the geometric effect of the lack of a third degree of freedom in a two-degree-of-freedom gyroscope. This gimbal correction can be effected due to the availability of an actual measure of the gimbal angle $\epsilon$ as provided by the output signal of the pick-off 8 which is applied on line 20 to the circuit 19 as is the heading output signal from the pick-off 7 on a line 21. Further inputs to the computing circuit 19 are the pitch and roll signals taken from lines 11 and 12, respectively. The function of the computing circuit 19 will be discussed in more detail hereinafter but the corrected or true heading output signal $\psi_t$ thereof derived from the input signals is applied on a line 22 to a further digital processor 23.

A flux valve 24 provides one input signal to the processor 23, the signal representing the magnetic heading $\psi_{mag}$ of the aircraft. Further inputs are a bias correction for the directional gyroscope 1 on line 25, a latitude correction on line 26, and a meridian convergence correction on line 27, these various inputs to the processor 23 conforming to conventional practice. The processor 23 provides two ouputs, one on line 28 giving a magnetically slaved heading signal, and the other on line 29 giving the directional gyroscope output signal. Only one of the two outputs on lines 28 and 29 is used at a given instance, the pilot switching from one to the other as appropriate.

Reverting now to the computing circuit 13, it is, in this preferred embodiment, arranged to solve the following equation derived from well-known transformations from Earth's axes to vehicle axes to gyro axes:

$$\text{Tan } \epsilon_c = \frac{\sin \Theta \cos \psi_m + \cos \Theta \sin \phi \sin \psi_m}{\cos \Theta \cos \phi} \quad (1)$$

This equation assumes that the spin axis 3 of the directional gyroscope 1 is horizontal in order to give a first measure of the angle $\epsilon$. However, other equations may be used to give the desired angle $\epsilon_c$.

The comparator 16 is not a simple comparator in that it is designed to solve the following equation to provide the error signal used to drive the erection torquer 6 of the directional gyroscope 1:

$$\epsilon_c - \epsilon_m = \frac{\tan \epsilon_c - \tan \epsilon_m}{1 + \tan \epsilon_c \tan \epsilon_m} \quad (2)$$

As for the computing circuit 19, this is arranged to solve the following equation to give the true heading output signal $\psi_t$ but again, other equations may be used to the same end:

$$\text{Tan } \psi_t = \frac{\cos \phi \sin \psi_m + \sin \phi \tan \epsilon_m}{\cos \psi_m \cos \Theta + \sin \Theta \cos \phi \tan \epsilon_m - \sin \Theta \sin \phi \sin \psi_m} \quad (3)$$

Equations (1) and (3) are derived from general equations of motion of a simple two-degree-of-freedom gyroscope.

Figure 1:
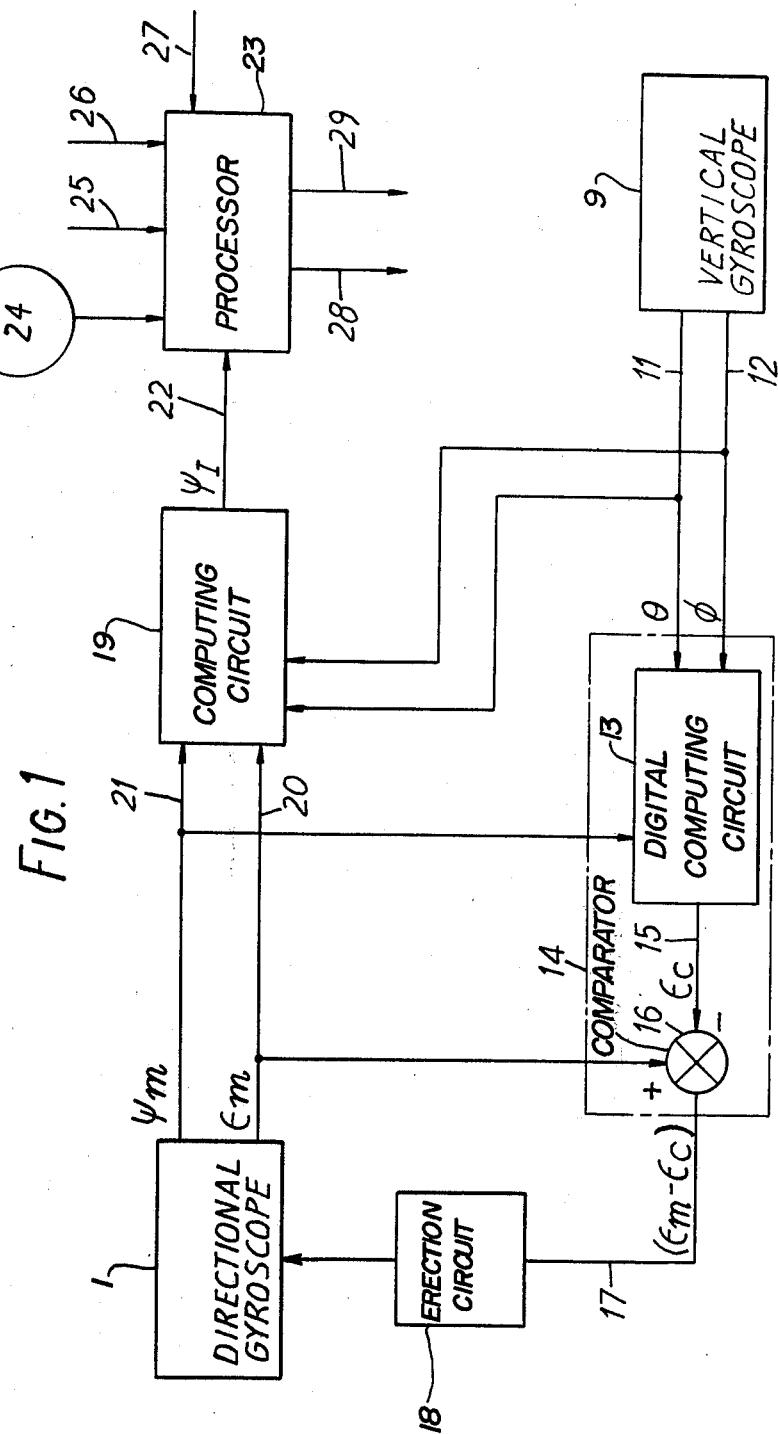
FIG. 1 is a block schematic diagram of the compass system.

Referring now to FIG. 2, this shows a more detailed, and preferred, system compared with that of FIG. 1. The directional gyroscope 1 is similar to that used in FIG. 1, as already mentioned although the pick-off 7 is in the form of a differential resolver. The computing circuits 13 and 19, the comparator 16 and the digital processor 23 of FIG. 1 are all embodied in a central processing unit (CPU) 31 with which are associated a random access memory (RAM) 32 and a read only memory (ROM) 33. A vertical gyroscope 9 and a flux valve 24 are employed as in FIG. 1, together with an erection control law circuit 18 which specifically comprises a flip-flop 34, a modulator 35 and an amplifier 36.

The outputs of the directional gyroscope 1, vertical gyroscope 9 and flux valve 24 are fed into the CPU 31 via an interface unit 37 comprising an analogue signal multiplexer 38, a comparator 39 and a digital-to-analogue convertor 41. The correction signals supplied on lines 25 and 27 in FIG. 1 are embodied in the CPU 31 in the present system but the latitude correction signal $\lambda$ is applied on line 26 as an input to the multiplexer 38. A further interface unit 42 is provided between the CPU 31 and the directional gyroscope 1, this unit comprising a digital-to-analogue convertor 43 and two parallel channels each having a sample-and-hold circuit 44 and a modulator 45, and respectively deriving signals proportional to in $\delta$ and $\cos \delta$ where $\delta$ is the difference between indicated and true heading.

In order to avoid the need for a high-speed CPU 31 and interface units 37 and 42, the system is designed to operate in a quasi-feedback mode. The differential resolver 7 used on the directional gyro 1 performs the fast following rates during a rapid turn of the aircraft, for example, and the CPU 31 calculates the correction signal $\delta$ which is relatively much slower moving — almost two orders slower. The operation of the compass system of FIG. 2 is as follows. The true heading $\psi_t$ is derived from the differential resolver 7 by the summation by the latter of the gyro heading $\psi_m$ and the correction signal $\delta'$, the value of $\delta$ from the previous cycle. The true heading $\psi_t$ is multiplexed into the CPU 31 together with the roll and pitch signals $\phi$, $\theta$, the signal $\epsilon_m$ and the magnetic heading $\psi_{mag}$ from the flux valve 24.

The first step is to compute $\psi_m$ which is done by storing and subtracting the correction signal $\delta'$ from the previous iteration cycle. Using $\psi$, $\phi$, $\theta$, $\psi_{mag}$ and $\epsilon_m$ as shown earlier, the new correction signal $\delta$ is calculated and fed as an input to the resolver 7 via the interface unit 42. This is a continuous process which can be operated relatively slowly (about 40 m. seconds) and still achieve a very high system accuracy (better than 0.1°) even during complex aircraft manoeuvres.

It will be appreciated that each of the described compass systems is no bulkier than the known systems using liquid levels to maintain the spin axis of the directional gyroscope horizontal, so that it offers similar size advantages as the known system. It is also less bulky than the known stabilised systems in that no additional gimbals are required thereby affording a further advantage of economy in manufacture, the previous additional gimbals being essentially replaced by an analytic stabilisation of the directional gyroscope. However, the accuracy of the present system is at least as good as, if not better, than the known stabilised systems. Another particularly advantageous feature of the present invention is that the partial failure of the computing circuit 13 or 19, or CPU 31, or vertical gyroscope 9 is not catastrophic since if the erection torquer 6 is slaved directly to the pick-off 8 to maintain the inner and outer gimbals 4, 5 orthogonal, a heading output signal is obtained which is accurate if the outer gimbal 5 is vertical. This reversionary capability may be employed in a compass system designed for a land vehicle when the directional gyroscope 1 is detached from the vehicle and used as a remote bearing indicator as is sometimes required.

We claim:
1. A compass system for a vehicle comprising
   a two-degree-of-freedom directional gyroscope having inner and outer gimbals and operable to pro- duce an electrical output signal representative of the heading of the vehicle in which the compass system is fitted, vertical reference means operable to provide an output signal representative of the pitch and/or roll of the vehicle, computer means to derive from the output signals of the directional gyroscope and the vertical reference means a signal representative of the angle between the inner and outer gimbals of the directional gyroscope which would exist if the plane of the inner gimbal were parallel to the Earth's horizontal axis, a pick-off means operable to measure the true angle between the inner and outer gimbals of the directional gyroscope, comparator means operable to compare the signal from the computer means with the signal from the pick-off means to provide an output signal representative of the error in the angle between the inner and outer gimbals of the directional gyroscope, the error signal being applied to an erection system forming part of the directional gyroscope to adjust the plane of the inner gimbal substantially parallel to the Earth's horizontal axis.

2. A system according to claim 1, wherein the output signals from the directional gyroscope and the vertical reference means are applied to the computer means via an interface unit, and wherein the output signal from the directional gyroscope representative of the vehicle heading is derived from a differential resolver to which a correction input signal is applied from the computer means via a further interface unit, whereby the system operates in a quasi-feedback mode such that the computer means, the interface unit and the further interface unit may be of relatively slow operation.

3. A system according to claim 2, wherein the correction input signal to the differential resolver is a signal representative of the difference between true and indicated vehicle heading.

4. A system according to claim 2, wherein the comparator means are embodied in the computer means.

5. A system according to claim 1 further including means to effect gimbal error correction in the directional gyroscope.

6. A system according to claim 5, wherein said means to effect gimbal error correction comprise a computing circuit to which are applied as input signals the output signals from the directional gyroscope and vertical reference means.

7. A system according to claim 5, wherein said means to effect gimbal error correction are embodied in the computer means.

8. A system according to claim 1, wherein the directional gyroscope is a flex gyroscope.

9. A system according to claim 1, wherein the vertical reference means is in the form of a two-degree-of-freedom gyroscope.

10. A system according to claim 1, wherein the vertical reference means is in the form of a flex gyroscope.

* * * * *